(12) United States Patent
Lamping et al.

(10) Patent No.: US 8,799,270 B1
(45) Date of Patent: *Aug. 5, 2014

(54) DETERMINING QUERY TERMS OF LITTLE SIGNIFICANCE

(75) Inventors: John Lamping, Los Altos, CA (US); Christophe Bisciglia, Redwood City, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/616,768

(22) Filed: Sep. 14, 2012

Related U.S. Application Data

(63) Continuation of application No. 11/090,302, filed on Mar. 28, 2005, now Pat. No. 8,346,757.

(51) Int. Cl.
*G06F 7/00* (2006.01)
*G06F 17/30* (2006.01)

(52) U.S. Cl.
USPC .......................................... 707/713; 707/758

(58) Field of Classification Search
None
See application file for complete search history.

(56) References Cited

U.S. PATENT DOCUMENTS

| | | | |
|---|---|---|---|
| 5,737,734 A | 4/1998 | Schultz | |
| 6,006,221 A | 12/1999 | Liddy et al. | |
| 6,006,225 A | 12/1999 | Bowman et al. | |
| 6,285,999 B1 | 9/2001 | Page | |
| 6,697,793 B2 | 2/2004 | McGreevy | |
| 8,346,757 B1 | 1/2013 | Lamping et al. | |
| 2002/0188599 A1* | 12/2002 | McGreevy | 707/3 |
| 2003/0050924 A1* | 3/2003 | Faybishenko et al. | 707/3 |
| 2005/0203934 A1 | 9/2005 | Meredith et al. | |
| 2005/0234953 A1 | 10/2005 | Zhang et al. | |

\* cited by examiner

*Primary Examiner* — Mariela Reyes
*Assistant Examiner* — Hexing Liu
(74) *Attorney, Agent, or Firm* — Harrity & Harrity, LLP

(57) ABSTRACT

A system determines whether a term of a search query is a term with little significance based on a context of the search query. The system performs a search based on the search query while considering the term with little significance as optional when the search query includes the term with little significance and presents a list of search results based on the search.

20 Claims, 12 Drawing Sheets

FIG. 5

| TERM | CONTEXT(S) OF LITTLE SIGNIFICANCE | SIGNIFICANT CONTEXT(S) |
|---|---|---|
| | CONTEXT(S) IN WHICH TERM 1 HAS LITTLE SIGNIFICANCE | CONTEXT(S) IN WHICH TERM 1 IS SIGNIFICANT |
| TERM 1 | (. .) ... | (. PRESS)<br>(. FOR ALL)<br>(PESTICIDE . )<br>(DETROIT . PRESS)<br>... |
| FREE | | |
| ... | | |

SEARCH QUERY: KILLER WHALE FREE PHOTOS

QUERY TERM TABLE:

| TERM | CONTEXT(S) OF LITTLE SIGNIFICANCE | SIGNIFICANT CONTEXT(S) |
|---|---|---|
| FREE | (.) | (. PRESS)<br>(. FOR ALL)<br>(PESTICIDE .)<br>(SUGAR .) |

SEARCH PERFORMED FOR: KILLER WHALE PHOTOS -- "FREE" IS TREATED AS OPTIONAL

SCORING: DOWN WEIGHT CONTRIBUTION OF "FREE" IN DOCUMENT SCORE WHEN DOCUMENT INCLUDES THE TERM "FREE"

FIG. 9

SEARCH QUERY: SUGAR FREE SODA

QUERY TERM TABLE:

| TERM | CONTEXT(S) OF LITTLE SIGNIFICANCE | SIGNIFICANT CONTEXT(S) |
|---|---|---|
| FREE | (.) | (. PRESS)<br>(. FOR ALL)<br>(PESTICIDE .)<br>(SUGAR .) |

SEARCH PERFORMED FOR: SUGAR FREE SODA

SCORING: SCORE DOCUMENT NORMALLY

FIG. 10

SEARCH QUERY: HYBRID AUTOMOBILE

QUERY TERM TABLE:

| TERM | CONTEXT(S) OF LITTLE SIGNIFICANCE | SIGNIFICANT CONTEXT(S) |
|---|---|---|
| AUTOMOBILE | (FORD.) (TOYOTA.) (CHEVROLET.) | (.) |

SEARCH PERFORMED FOR: HYBRID AUTOMOBILE

SCORING: SCORE DOCUMENT NORMALLY

FIG. 11

SEARCH QUERY: FORD AUTOMOBILE

QUERY TERM TABLE:

| TERM | CONTEXT(S) OF LITTLE SIGNIFICANCE | SIGNIFICANT CONTEXT(S) |
|---|---|---|
| AUTOMOBILE | (FORD . )<br>(TOYOTA . )<br>(CHEVROLET . ) | ( . ) |

SEARCH PERFORMED FOR: FORD -- "AUTOMOBILE" IS TREATED AS OPTIONAL

SCORING: DOWN WEIGHT CONTRIBUTION OF "AUTOMOBILE" IN DOCUMENT SCORE WHEN DOCUMENT INCLUDES THE TERM "AUTOMOBILE"

DETERMINING QUERY TERMS OF LITTLE SIGNIFICANCE

RELATED APPLICATION

This application is a continuation of U.S. patent application Ser. No. 11/090,302, filed on Mar. 28, 2005, the disclosure of which is incorporated herein by reference.

BACKGROUND

1. Field of the Invention

Implementations described herein relate generally to information retrieval and, more particularly, to the determination and processing of queries that include terms of little significance.

2. Description of Related Art

The World Wide Web ("web") contains a vast amount of information. Locating a desired portion of the information, however, can be challenging. This problem is compounded because the amount of information on the web and the number of new users inexperienced at web searching are growing rapidly.

Search engines attempt to return hyperlinks to web pages in which a user is interested. Generally, search engines base their determination of the user's interest on search terms (called a search query) entered by the user. The goal of the search engine is to provide links to high quality, relevant results (e.g., web pages) to the user based on the search query. Typically, the search engine accomplishes this by matching the terms in the search query to a corpus of pre-stored web pages. Web pages that contain the user's search terms are considered "hits" and are returned to the user as links.

Sometimes users include more words ("extra words") in their search queries than are required to identify the information they seek. These extra words often degrade the quality of the search results. Some search engines identify "stop words" (e.g., "a," "the," "of," "is," etc.) and ignore the stop words when they are included in a search query. Other search engines identify "common words" by analyzing a corpus based on term frequency (TF) or inverse document frequency (IDF) and ignore the common words when they are included in a search query. Sometimes these techniques fail to lead to quality search results.

SUMMARY

According to one aspect, a system may include means for determining whether a term of a search query is a term with little significance based on a context of the search query; means for performing a search based on the search query while considering the term with little significance as optional when the search query includes the term with little significance; and means for determining a list of search results based on the search.

According to another aspect, a method may include analyzing query logs to identify pairs of queries that are the same except that one of the queries in each of the pairs of queries includes an extra term; determining whether a group of the pairs of queries includes a number of search results that are common or different between the pair of queries; identifying the extra term as a term of generally little significance when a group of the pairs of queries includes a number of search results that are common between each of the pairs of queries in the group; and identifying the extra term as a term that is generally significant when a group of the pairs of queries includes a number of search results that are different between each of the pairs of queries in the group.

According to a further aspect, a data structure implemented on a computer-readable medium includes a first field that stores a term, a second field that stores a context in which the term stored in the first field has little significance when present in a search query, and a third field that stores a context in which the term stored in the first field is significant when present in a search query.

According to another aspect, a method may include receiving a search query; determining that the search query includes a term with little significance in a context of the search query; identifying documents based on the search query; scoring the identified documents, where the term with little significance contributes less than another term of the search query to a score of one of the identified documents that includes both the term with little significance and the other term; and determining a list of search results based on scores of the identified documents.

According to yet another aspect, a method may include receiving a search query; analyzing query logs to determine whether a term of the search query has little significance; identifying documents based on the search query while considering the term with little significance as optional when the search query includes the term with little significance; and determining a list of search results based on the identified documents.

According to a further aspect, a method may include receiving a search query; analyzing query logs to determine whether a term of the search query has little significance; identifying documents based on the search query; scoring the identified documents, where the term of little significance contributes less than another term of the search query to a score of one of the identified documents that includes both the term of little significance and the other term; and determining a list of search results based on scores of the identified documents.

BRIEF DESCRIPTION OF THE DRAWINGS

The accompanying drawings, which are incorporated in and constitute a part of this specification, illustrate one or more embodiments of the invention and, together with the description, explain the invention. In the drawings.

FIG. 5 is a diagram of an exemplary query term table according to an implementation consistent with the principles of the invention;

FIGS. 9-12 are diagrams that illustrate processing that may be performed with regard to a search query according to an implementation consistent with the principles of the invention.

DETAILED DESCRIPTION

Figure 1:
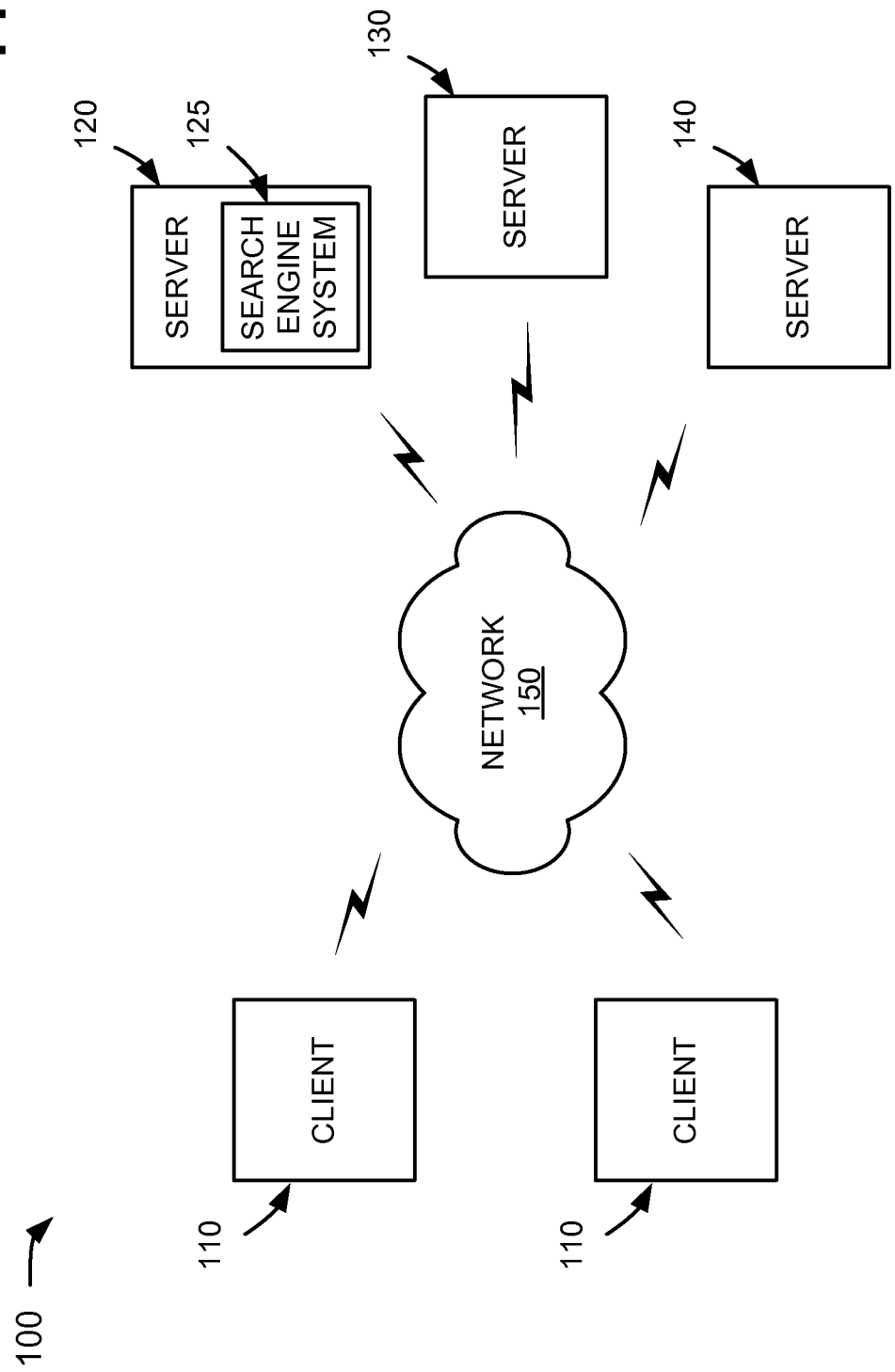
FIG. 1 is an exemplary diagram of a network in which systems and methods consistent with the principles of the invention may be implemented.

The following detailed description of the invention refers to the accompanying drawings. The same reference numbers in different drawings may identify the same or similar elements. Also, the following detailed description does not limit the invention.

Overview

The operations performed by a search engine system can generally be divided into two categories: document selection and document ranking. Document selection may involve the identification of documents that are candidates for retrieval. For a document to be identified as a candidate, the document typically needs to include all of the terms of the search query (excluding stop words). Document ranking may involve the determination of how well a candidate document matches the search query. While document selection and document ranking can be logically separate, they are typically interleaved, where the document ranking may be performed for a document as it is identified as a candidate document.

As users attempt to approximate their information need with search queries, the quality of their approximation tends to decrease as they include more terms in the query. Long queries, such as queries that include more than three or four terms, tend to over-specify a user's information need by using extra terms that do not help describe their information need (i.e., terms that have little informational significance).

These terms of little significance may be problematic in both the document selection and the document ranking operations. Often, a term of little significance is not present in documents that satisfy the user's information need, and only serves to decrease the number of documents considered for scoring. The number of documents containing all N query terms is much smaller than the number of documents containing N-k terms (for N>k>0). Oftentimes, the best result for a user's query is in this larger set of documents, and would not be found if all N terms were required. Also, when a term of little significance is given equal weight to other terms of the search query in the document ranking operation, it may serve to artificially inflate the rank (or score) of a document, and thus degrade the quality of the search results.

It can be difficult to determine which terms are insignificant to a user's information need. Current methods that identify stop words and common words are generally inadequate when applied to user queries, as many times, a word that is identified as common can have a very specific meaning (and thus be significant) when used in conjunction with some other word. For example, consider the queries "information about mazda cars" and "information technology practices." In the first case, the user likely desires documents relating to the terms "mazda" and "cars" (i.e., the term "information" is insignificant as it does not accurately describe the user's information need). In the second case, however, the user likely desires documents relating to the terms "information," "technology," and "practices," and likely not documents relating to just the terms "technology" and "practices" (i.e., the term "information" is significant in this context).

Systems and methods consistent with the principles of the invention may identify terms that have little significance in certain contexts and process the terms based on the contexts in which they occur in search queries. The phrase "little significance" is intended to mean something less than "significant" (including, e.g., "insignificant"). In general, a term is deemed to have little significance when it is likely to be less important or useful than other search terms in a query in identifying a user's information need. When a term of little significance is deemed to occur in a search query, the systems and methods may ignore or reduce the contribution the term makes during the document selection operation and/or the document ranking operation. The systems and methods may operate in conjunction with techniques that identify stop words and/or common words.

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

FIG. 1 is an exemplary diagram of a network 100 in which systems and methods consistent with the principles of the invention may be implemented. Network 100 may include multiple clients 110 connected to multiple servers 120-140 via a network 150. Two clients 110 and three servers 120-140 have been illustrated as connected to network 150 for simplicity. In practice, there may be more or fewer clients and servers. Also, in some instances, a client may perform some functions of a server and a server may perform some functions of a client.

Clients 110 may include client entities. An entity may be defined as a device, such as a wireless telephone, a personal computer, a personal digital assistant (PDA), a laptop, or another type of computation or communication device, a thread or process running on one of these devices, and/or an object executable by one of these devices. Servers 120-140 may include server entities that gather, process, search, and/or maintain documents in a manner consistent with the principles of the invention.

In an implementation consistent with the principles of the invention, server 120 may include a search engine system 125 usable by clients 110. Server 120 may crawl a corpus of documents (e.g., web documents), index the documents, and store information associated with the documents in a repository of documents. Servers 130 and 140 may store or maintain documents that may be crawled or analyzed by server 120.

While servers 120-140 are shown as separate entities, it may be possible for one or more of servers 120-140 to perform one or more of the functions of another one or more of servers 120-140. For example, it may be possible that two or more of servers 120-140 are implemented as a single server. It may also be possible for a single one of servers 120-140 to be implemented as two or more separate (and possibly distributed) devices.

Network 150 may include a local area network (LAN), a wide area network (WAN), a telephone network, such as the Public Switched Telephone Network (PSTN), an intranet, the Internet, a memory device, or a combination of networks.

Clients 110 and servers 120-140 may connect to network 150 via wired, wireless, and/or optical connections.

Exemplary Client/Server Architecture

Figure 2:
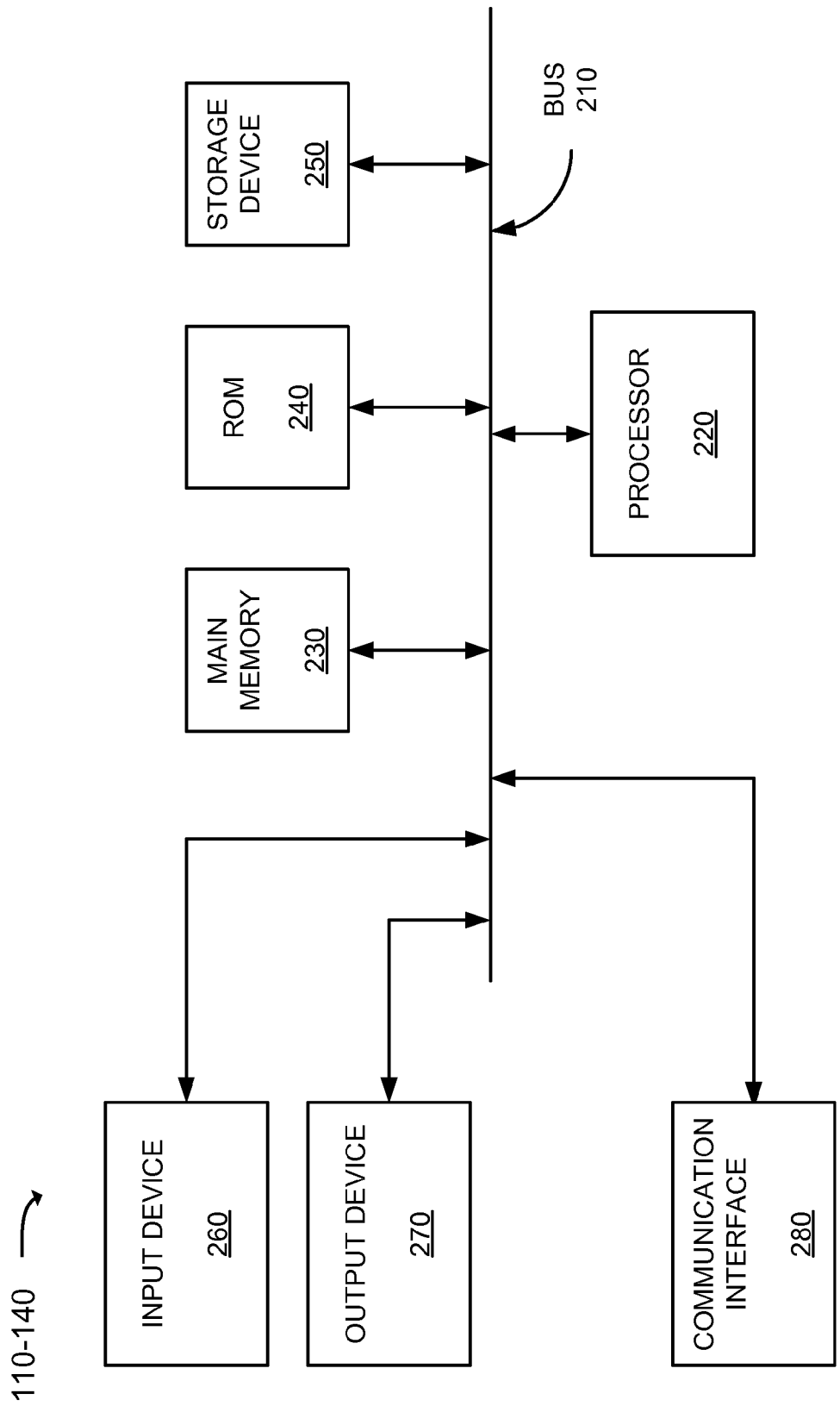
FIG. 2 is an exemplary diagram of a client or server of FIG. 1 according to an implementation consistent with the principles of the invention.

FIG. 2 is an exemplary diagram of a client or server entity (hereinafter called "client/server entity"), which may correspond to one or more of clients 110 and/or servers 120-140, according to an implementation consistent with the principles of the invention. The client/server entity may include a bus 210, a processor 220, a main memory 230, a read only memory (ROM) 240, a storage device 250, an input device 260, an output device 270, and a communication interface 280. Bus 210 may include a path that permits communication among the elements of the client/server entity.

Processor 220 may include a conventional processor, microprocessor, or processing logic that may interpret and execute instructions. Main memory 230 may include a random access memory (RAM) or another type of dynamic storage device that may store information and instructions for execution by processor 220. ROM 240 may include a conventional ROM device or another type of static storage device that may store static information and instructions for use by processor 220. Storage device 250 may include a magnetic and/or optical recording medium and its corresponding drive.

Input device 260 may include a conventional mechanism that permits an operator to input information to the client/server entity, such as a keyboard, a mouse, a pen, voice recognition and/or biometric mechanisms, etc. Output device 270 may include a conventional mechanism that outputs information to the operator, including a display, a printer, a speaker, etc. Communication interface 280 may include any transceiver-like mechanism that enables the client/server entity to communicate with other devices and/or systems. For example, communication interface 280 may include mechanisms for communicating with another device or system via a network, such as network 150.

The client/server entity, consistent with the principles of the invention, may perform certain operations, as will be described in detail below. The client/server entity may perform these operations in response to processor 220 executing software instructions contained in a computer-readable medium, such as memory 230. A computer-readable medium may be defined as a physical or logical memory device and/or carrier wave.

The software instructions may be read into memory 230 from another computer-readable medium, such as data storage device 250, or from another device via communication interface 280. The software instructions contained in memory 230 may cause processor 220 to perform processes or operations that will be described later. Alternatively, hardwired circuitry may be used in place of or in combination with software instructions to implement processes or operations consistent with the principles of the invention. Thus, implementations consistent with the principles of the invention are not limited to any specific combination of hardware circuitry and software.

Exemplary Query Term Analyzer System

Figure 3:
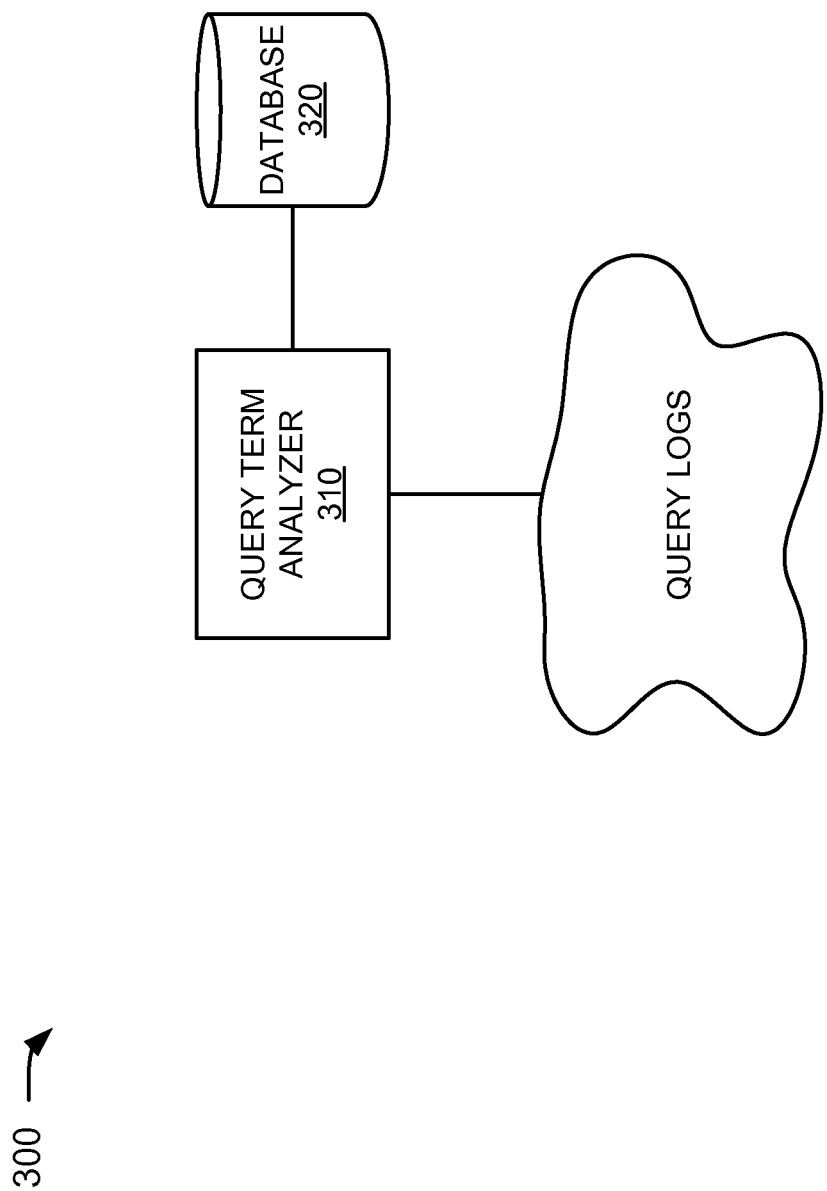
FIG. 3 is an exemplary diagram of a query term analyzer system according to an implementation consistent with the principles of the invention.

FIG. 3 is an exemplary diagram of a query term analyzer system 300 according to an implementation consistent with the principles of the invention. In one implementation, query term analyzer system 300 may be implemented by software and/or hardware within server 120 (FIG. 1), within another device, or within a group of devices separate from or including server 120.

As shown in FIG. 3, query term analyzer system 300 may include a query term analyzer 310 and a database 320. Query term analyzer 310 may analyze query logs (i.e., logs of user search queries and associated data, such as search results that were identified based on the search queries) to identify contexts in which terms have little significance, and/or contexts in which terms are significant. Query term analyzer 310 may create or supplement a query term table based on a result of its analysis. The query term table may be stored in database 320.

Figure 4:
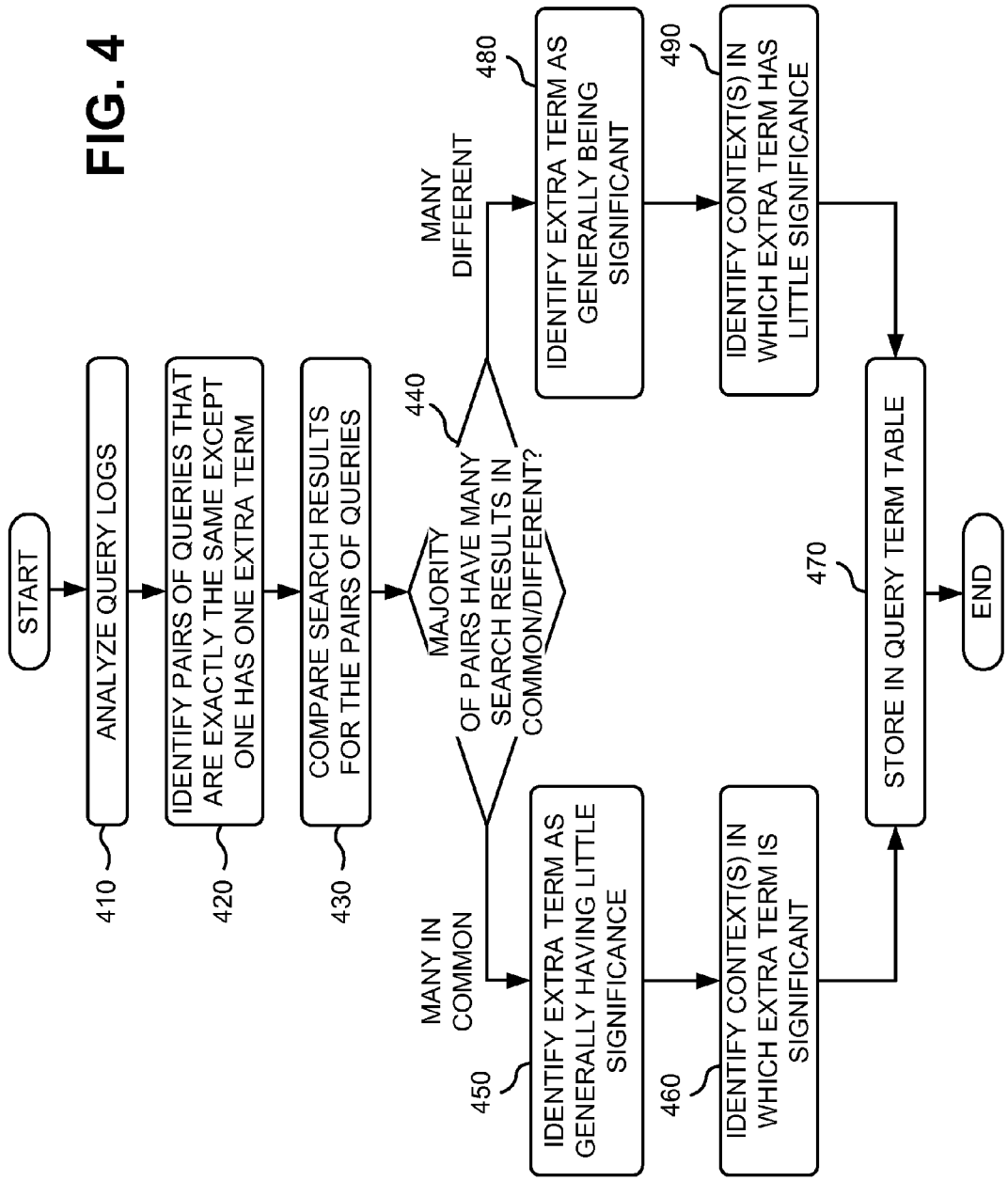
FIG. 4 is a flowchart of exemplary processing for identifying contexts in which terms have little significance and/or are significant according to an implementation consistent with the principles of the invention.

FIG. 4 is a flowchart of exemplary processing for identifying contexts in which terms have little significance and/or are significant according to an implementation consistent with the principles of the invention. Processing may begin with an analysis of query logs (block 410) to identify pairs of queries that are the same except that one of the queries includes an extra term (block 420). In one implementation, for each extra term under consideration, a large group of pairs of queries may be identified in the query logs (e.g., a thousand or more pairs of queries may be identified).

The search results for each of the pairs of queries may be compared (block 430). For example, in one implementation, searches have been previously performed based on each of the queries, and a list of search results has been identified for each query. The list of search results corresponding to a particular query may be stored in the query logs with the query. The lists of search results for each query in a pair of queries may be compared to determine how many of the results are common to the two queries. When there are many search results in common (e.g., greater than some threshold) for a pair of search queries, this may be indicative that the extra term has little significance in the context of the search query. When there are many search results that are different (e.g., greater than some threshold, which may be different from the threshold used to determine when there are many search results in common) for a pair of search queries, this may be indicative that the extra term is significant in the context of the search query.

It may then be determined whether many (e.g., greater than some threshold, which may be different than the thresholds specified above, and may be, for example, a majority such as fifty percent) of the pairs of search queries have many search results in common or many search results that are different (block 440). For example, the pairs may be deemed to have many search results in common when a majority of the pairs have at least 30% of their search results in common and no more than 20% of the pairs have none of their search results in common.

Continuing with this example, when a majority of the pairs of search queries have many search results in common (block 440—MANY IN COMMON), then the extra term may be identified as a term that generally has little significance (block 450). When a term is identified as generally having little significance, it means that the term may typically have little significance when it appears anywhere in a search query.

If a term is identified as generally having little significance, the context(s) in which the extra term is significant, if any, may be identified (block 460). A context, as used herein, may include a specific term or a sequence of terms that appears just before or after a query term, or both. A context may also indicate that a term is generally of little significance or generally significant when it appears anywhere in a query.

In one implementation, a large number of pairs of queries (e.g., one hundred or more) in which the extra term appears in a similar context (e.g., the same or substantially the same context) may be identified. The search results for the pairs of queries may be compared and it may be determined whether many of the search results for a majority of the pairs (e.g., greater than some threshold) are different between the pairs. When many of the search results for a majority (or some threshold) of the pairs are different between the pairs, then the extra term may be identified as significant in the context of the queries. This may be repeated for other query contexts. The extra term, an indication that it generally has little significance, and the context(s) in which it is significant, if any, may be stored in a query term table (block 470).

FIG. 5 is a diagram of an exemplary query term table 500 according to an implementation consistent with the principles of the invention. As shown in FIG. 5, query term table 500 may include three fields: a term field 510, a context(s) of little significance field 520, and a significant context(s) field 530. In other implementations, query term table 500 may include more or different information. Term field 510 may identify terms that have been determined to have little significance or that are significant in particular contexts. Context(s) of little significance field 520 may identify the contexts in which the terms have been determined to have little significance. In one implementation, the context for a term may be "anywhere"—meaning that the term has generally little significance when it appears anywhere in a search query. Significant context(s) field 530 may identify the contexts in which the terms have been determined to be significant. In one implementation, the context for a term may be "anywhere"—meaning that the term is generally significant when it appears anywhere in a search query.

As shown in FIG. 5, an example term in query term table 500 might include the word "free." Assume that the word "free" has been determined to generally have little significance when included anywhere in a search query. Assume that the particular contexts in which the word "free" is determined to be significant is when "free" precedes "press," when "free" precedes "for all," when "free" follows "pesticide," and when "free" follows "detroit" and precedes "press." Context(s) of little significance field 520, in this case, might include (.) (where "." indicates where "free" appears in the search query) to indicate that the word "free" generally has little significance when it appears anywhere in a search query. Significant context(s) field 530 might include (. press), (. for all), (pesticide .), and (detroit . press) to indicate the contexts in which the word "free" is significant.

Returning to FIG. 4, when a majority (or some threshold) of the pairs of search queries have many search results that are different (block 440—MANY DIFFERENT), then the extra term may be identified as a term that is generally significant (block 480). When a term is identified as generally being significant, it means that the term may typically be significant when it appears anywhere in a search query.

The context(s) in which the extra term has little significance, if any, may be identified (block 490). In one implementation, a large number of pairs of queries (e.g., one hundred or more) in which the extra term appears in a similar context may be identified. The search results for the pairs of queries may be compared and it may be determined whether many of the search results for a majority (or some threshold) of the pairs are common between the pairs. When many of the search results for a majority of the pairs are common between the pairs, then the extra term may be identified as having little significance in the context of the queries. This may be repeated for other query contexts. The extra term, an indication that it is generally significant, and the context(s) in which it has little significance, if any, may be stored in the query term table (block 470).

It is possible that for some extra terms less than a majority of pairs of queries have many search results in common or many search results that are different or a majority of pairs of queries neither have many search results in common nor have many search results that are different. These extra terms may be treated as significant by default. In other implementations, these extra terms may be treated differently.

In addition, or alternatively, other signals may be extracted from the query logs to determine whether a query term has little significance (or is significant). For example, sequences of queries may be examined to determine whether individual users provided a search query with a term, followed by the same search query with that term removed. If this occurs frequently (e.g., for approximately 1% or more of the queries), then this can be a good indication that the term has little significance. If it does not occur frequently, then it suggests that the term is significant. This can be tracked for different contexts in which the term appears. This signal can be used to supplement a determination made using the processing described above. Alternatively, this signal may be used to determine when a query term has little significance instead of the above processing or when the above processing cannot provide a reliable determination (e.g., when less than a majority of pairs of queries have many search results in common or many search results that are different or a majority of pairs of queries neither have many search results in common nor have many search results that are different).

Exemplary Search Engine System

Figure 6:
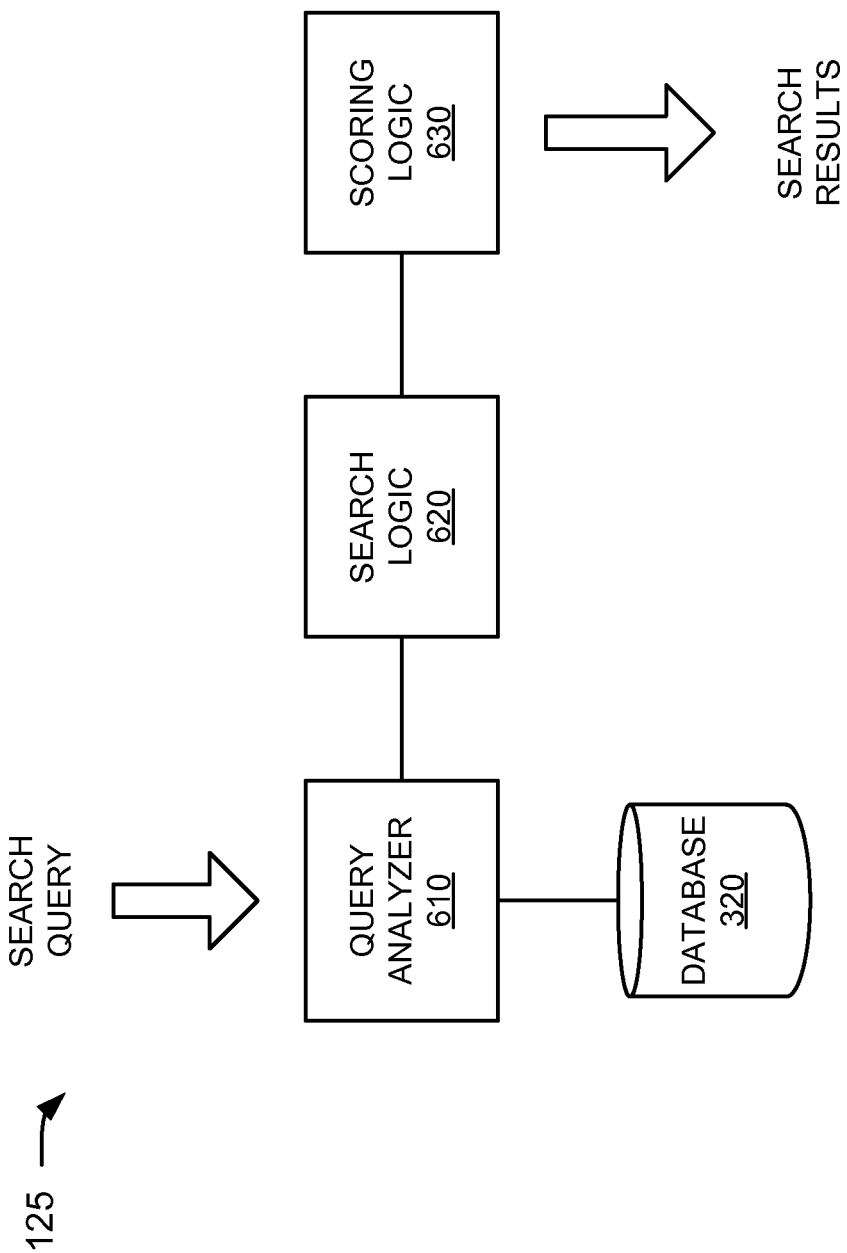
FIG. 6 is an exemplary diagram of the search engine system of FIG. 1 according to an implementation consistent with the principles of the invention.

FIG. 6 is an exemplary diagram of search engine system 125 according to an implementation consistent with the principles of the invention. In one implementation, search engine system 125 may be implemented by software and/or hardware within server 120 (FIG. 1), within another device, or within a group of devices separate from or including server 120.

As shown in FIG. 6, search engine system 125 may include query analyzer 610, search logic 620, and scoring logic 630. Query analyzer 610 may receive and process a search query to determine whether any of the terms have little significance in the context of the query. Query analyzer 610 may make its determination based on information in the query term table stored in database 320.

Search logic 620 may perform a search based on the search query and the determination of whether any of the terms have little significance. For example, search logic 620 may consider a term of little significance optional when performing the search. In other words, a document need not include the optional term to be included in the list of search results.

Scoring logic 630 may score the documents in the list of search results. In one implementation, scoring logic 630 may "down weight" the contribution of the term of little significance to the score of a document that includes the term. In other words, the term of little significance may contribute a lesser amount to the score of a document than other terms of the search query. For example, if each term of the search query would normally contribute one point to the score of a document that includes the term, the term of little significance may contribute a fraction of a point to the score when the document includes the term. This down weighting permits the term of little significance to contribute less to the total score of a document, while still benefiting documents that contain the term over those that do not.

Figure 7:
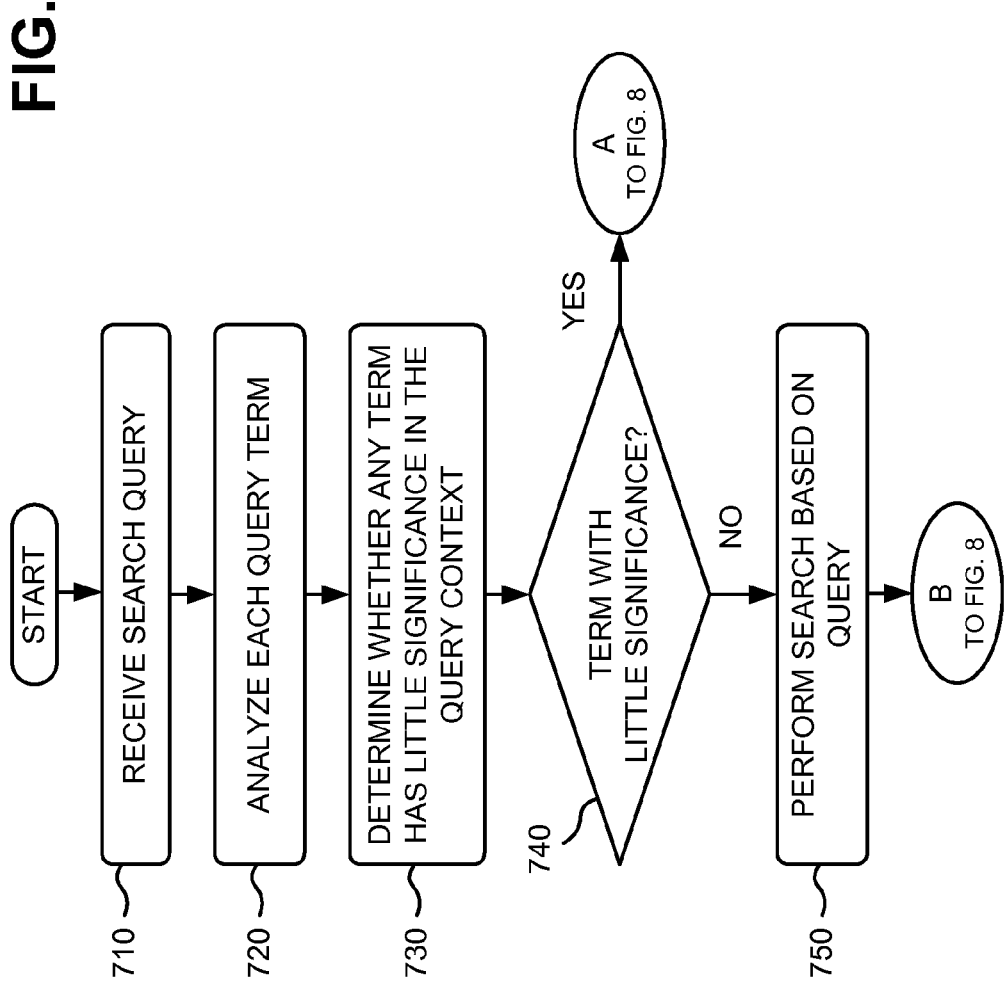
FIGS. 7 and 8 are flowcharts of exemplary processing for performing a search according to an implementation consistent with the principles of the invention.
Figure 8:
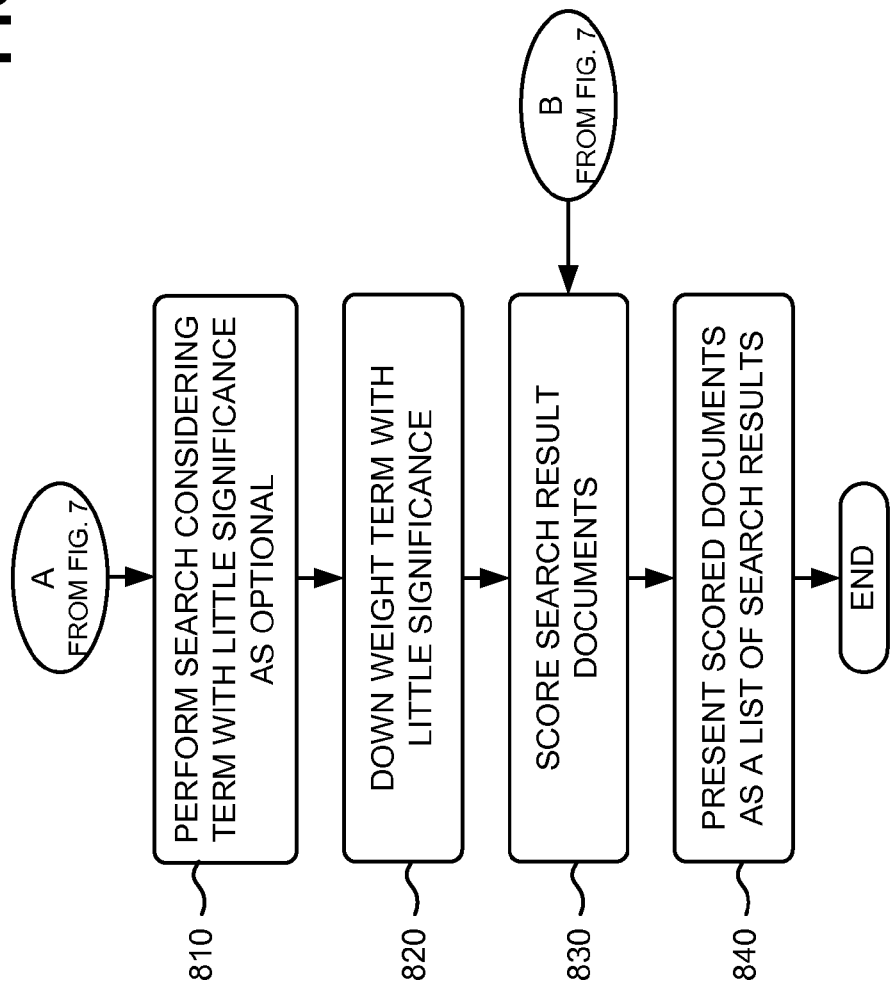

FIGS. 7 and 8 are flowcharts of exemplary processing for performing a search according to an implementation consistent with the principles of the invention. Processing may begin with receipt of a search query (block 710) (FIG. 7). In one implementation, a user may use a web browser associated with a client 110 to provide the search query to server 120. As one example, assume that the search query "free computer games" has been received.

Each term of the search query may be analyzed to determine whether any of the terms can be deemed to be terms of little significance in the context of the search query (blocks 720 and 730). For example, a term of the search query may be compared to information in the query term table to determine whether the term has little significance (or conversely is significant) in the context of this search query.

In one implementation, the most specific context that the term matches in the query term table may be identified. For example, assume that the query term table indicates that the word "free" has generally little significance when it appears in a query (e.g., "free" generally has little significance in the context (.)), but is significant in certain contexts (e.g., "free" is significant in the contexts (. press) and (pesticide .)). Then, in the query "free online games," the word "free" may have little significance because the most specific context that it matches is (.). But, in the query "pesticide free food," the word "free" would be significant because it matches the more specific context (pesticide .).

When the search query includes a term with little significance (block 740—YES), a search may be performed based on the search query, where the term with little significance may be considered as optional (block 810) (FIG. 8). For example, documents may be identified that include the search query terms but not necessarily the term with little significance. In the case of the search query "free computer games," a search may be performed to identify documents that include the terms "computer" and "games," and possibly include the term "free." By not requiring the term "free" to appear in documents identified during this document selection operation, a larger set of potentially relevant documents may be identified for the search query.

During the document scoring operation, the terms of the search query may be weighted, where the term with little significance may be weighted less (i.e., down weighted) than other terms of the search query (block 820). For example, assume that the terms "computer" and "games" are assigned weights of a first value (e.g., one) and the term "free" (i.e., the term with little significance) is assigned a weight of a second value less than the first value (e.g., a fraction of one). In another implementation, significant terms in the query, such as the terms "computer" and "games," are assigned weights of possibly different values.

The documents identified as search results may be scored (block 830). For example, an information retrieval (IR) score may be generated for the identified documents. The IR score may be based, for example, on the number of occurrences of the search terms in the document and the weights assigned to the terms. For example, the IR score for a document that includes the terms "free," "computer," and "games" may be based on a combination of the second value (for "free"), the first value (for "computer"), and the first value (for "games"). The IR score for a document that includes just the terms "computer" and "games" may be based on a combination of the first value (for "computer") and the first value (for "games"). Accordingly, a document that includes the term with little significance (e.g., "free") may benefit from including the term over a document that does not include the term.

The IR score may be adjusted based on where the search terms occur within the document (e.g., title, content, etc.) or based on characteristics of the search terms (e.g., font, size, color, etc.). The IR score may also, or alternatively, be adjusted based on the proximity of the search terms when multiple search terms are present. Yet other techniques for generating or adjusting an IR score for a document are known to those skilled in the art.

In one implementation, total scores for the documents may be generated based on a combination of their IR scores and link-based scores associated with the documents. Several techniques exist for determining the link-based score of a document. One such technique is described in U.S. Pat. No. 6,285,999, entitled "METHOD FOR NODE RANKING IN A LINKED DATABASE," the contents of which are incorporated by reference.

The documents may be ranked (e.g., sorted) based on their scores and presented as a list of search results (block 840). The list of search results may be provided as a HTML document, similar to search results provided by conventional search engines. Alternatively, the search results may be provided according to a format agreed upon by the search engine and the client (e.g., Extensible Markup Language (XML)).

Returning to FIG. 7, when the search query does not include a term with little significance (block 740—NO), a search may be performed based on the search query (block 750). For example, documents may be identified that include all the search query terms (or a subset of the query terms, such as terms that are not stop words or common words). In the case of the search query "free computer games," a search may be performed to identify documents that include the terms "free," "computer," and "games."

The documents identified as search results may be scored (block 830) (FIG. 8). For example, an IR score may be generated for the identified documents. The IR score may be based on the number of occurrences of the search terms in the document. The IR score may be adjusted based on where the search terms occur within the document (e.g., title, content, etc.) or based on characteristics of the search terms (e.g., font, size, color, etc.). The IR score may also or alternatively be adjusted based on the proximity of the search terms when multiple search terms are present. Yet other techniques for generating or adjusting an IR score for a document are known to those skilled in the art. In one implementation, total scores for the documents may be generated based on a combination of their IR scores and link-based scores associated with the documents.

The documents may be ranked (e.g., sorted) based on their scores and presented as a list of search results (block 840). The list of search results may be provided as a HTML document, similar to search results provided by conventional search engines. Alternatively, the search results may be provided according to a format agreed upon by the search engine and the client (e.g., XML).

The techniques described above can be used either independently or in conjunction with each other. For example, in one implementation, the determination that a term has little significance is used only in the search/selection operation (e.g., by not requiring the term with little significance to appear in candidate documents). In another implementation, the determination that a term has little significance is used only in the scoring/ranking operation (e.g., by adjusting the score contribution corresponding to the term with little significance). In other implementations, the determination that a term has little significance can be used in both the search/selection and scoring/ranking operations.

Example

FIGS. 9-12 are diagrams that illustrate processing that may be performed with regard to a search query according to an implementation consistent with the principles of the invention. The example of FIG. 9 relates to the search query "killer whale free photos," where the term "free" is determined to have little significance in the context of the search query. The example of FIG. 10 relates to the search query "sugar free soda," where the term "free" is determined to be significant in the context of the search query. The example of FIG. 11 relates to the search query "hybrid automobile," where the term "automobile" is determined to be significant in the context of the search query. The example of FIG. 12 relates to the search query "ford automobile," where the term "automobile" is determined to have little significance in the context of the search query.

As shown in FIG. 9, assume that a user provides the search query "killer whale free photos." Each of the terms of the search query may be analyzed against the query term table. Assume that the terms "killer," "whale," and "photos" are identified in the query term table as generally being significant when they appear in a search query. Assume that an entry in the query term table indicates that the term "free" generally has little significance when it appears in a search query, but is significant when "free" is followed by "press" or "for all" or preceded by "pesticide" or "sugar." In this case, the term "free" has little significance because the most specific context that it matches is (.).

A search may be performed based on the search terms "killer," "whale," and "photos" and documents may be identified that include these terms and possibly the term of little significance (i.e., "free"). The terms of the search query may be weighted, where the term with little significance may be weighted less (i.e., down weighted) than other terms of the search query, as described above. For example, assume that the terms "killer," "whale," and "photos" are assigned weights of a first value (e.g., one) and the term "free" (i.e., the term with little significance) is assigned a weight of a second value less than the first value (e.g., a fraction of one, such as one-fourth (¼)).

The documents identified as search results may be scored. For example, an IR score may be generated for the identified documents. The IR score may be based on the number of occurrences of the search terms in the document and the weights assigned to the terms. For example, the IR score for a document that includes three occurrences of the term "killer," two occurrences of the term "whale," seven occurrences of the term "free," and four occurrences of the term "photos" may be based on a combination of three (for "killer"), two (for "whale"), seven-fourths (for "free"), and four (for "photos"). The IR score for a document that includes just three occurrences of the term "killer," two occurrences of the term "whale," and four occurrences of the term "photos" may be based on a combination of three (for "killer"), two (for "whale"), and four (for "photos"). Accordingly, a document that includes the term with little significance (e.g., "free") may benefit by including the term over a document that does not include the term.

A list of search results may be formed based on the identified documents and their scores, and presented to the user, as described above.

As shown in FIG. 10, assume that a user provides the search query "sugar free soda." Each of the terms of the search query may be analyzed against the query term table. Assume that the terms "sugar" and "soda" are identified in the query term table as generally being significant when they appear in a search query. Assume that an entry in the query term table indicates that the term "free" generally has little significance when it appears in a search query, but is significant when "free" is followed by "press" or "for all" or preceded by "pesticide" or "sugar." In this case, the term "free" is significant because the most specific context that it matches is (sugar .).

A search may be performed based on the search terms "sugar," "free," and "soda" and documents may be identified that include these terms. The documents identified as search results may be scored. For example, an IR score may be generated for the identified documents. A list of search results may be formed based on the identified documents and their scores, and presented to the user, as described above.

As shown in FIG. 11, assume that a user provides the search query "hybrid automobile." Each of the terms of the search query may be analyzed against the query term table. Assume that the term "hybrid" is identified in the query term table as generally being significant when it appears in a search query. Assume that an entry in the query term table indicates that the term "automobile" is generally significant when it appears in a search query, but has little significance when "automobile" is preceded by "ford," "toyota," or "chevrolet." In this case, the term "automobile" is significant because the most specific context that it matches is (.).

A search may be performed based on the search terms "hybrid" and "automobile" and documents may be identified that include these terms. The documents identified as search results may be scored. For example, an IR score may be generated for the identified documents. A list of search results may be formed based on the identified documents and their scores, and presented to the user, as described above.

As shown in FIG. 12, assume that a user provides the search query "ford automobile." Each of the terms of the search query may be analyzed against the query term table. Assume that the term "ford" is identified in the query term table as generally being significant when it appears in a search query. Assume that an entry in the query term table indicates that the term "automobile" is generally significant when it appears in a search query, but has little significance when "automobile" is preceded by "ford," "toyota," or "chevrolet." In this case, the term "automobile" has little significance because the most specific context that it matches is (ford .).

A search may be performed based on the search term "ford" and documents may be identified that include this term and possibly the term of little significance (i.e., "automobile"). The terms of the search query may be weighted, where the term with little significance may be weighted less (i.e., down weighted) than the other term of the search query, as described above. For example, assume that the term "ford" is assigned a weight of a first value (e.g., one) and the term "automobile" (i.e., the term with little significance) is assigned a weight of a second value less than the first value (e.g., a fraction of one, such as one-fourth (¼)).

The documents identified as search results may be scored. For example, an IR score may be generated for the identified documents. The IR score may be based on the number of occurrences of the search terms in the document and the weights assigned to the terms. For example, the IR score for a document that includes eight occurrences of the term "ford" and three occurrences of the term "automobile" may be based on a combination of eight (for "ford") and three-fourths (for "automobile"). The IR score for a document that includes just eight occurrences of the term "ford" may be based on eight (for "ford"). Accordingly, a document that includes the term with little significance (e.g., "automobile") may benefit by including the term over a document that does not include the term.

A list of search results may be formed based on the identified documents and their scores, and presented to the user, as described above.

Conclusion

Systems and methods consistent with the principles of the invention may identify terms that have little significance in certain contexts and process the terms based on the contexts in which they occur in search queries. When a term of little significance is deemed to occur in a search query, the systems and methods may reduce or ignore the contribution the term makes when selecting and/or scoring search result documents.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 4, 7, and 8, the order of the acts may be modified in other implementations consistent with the principles of the invention. Further, non-dependent acts may be performed in parallel.

In the preceding description, the phrase "little significance" has been used to refer to something less than full or regular significance. The phrase "not significant" may also be used to refer to something less than full or regular significance.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method comprising:
    analyzing, by a processor in a computer system, query logs to identify a pair of queries that are the same except that a first query, in the pair of queries, includes an extra term that is not included in a second query in the pair of queries;
    identifying, by a processor in the computer system, whether the pair of queries is associated with a quantity of search results that are common between the pair of queries;
    identifying, by a processor in the computer system, the extra term as a term that is not significant when the pair of queries is associated with at least a first threshold quantity of search results that are common between the pair of queries;
    processing, by a processor in the computer system, a query that includes the extra term to form a modified query when the extra term is identified as a term that is not significant; and
    identifying, by a processor in the computer system, search results based on the modified query when the extra term is identified as a term that is not significant.

2. The method of claim 1, further comprising:
    determining, after identifying the extra term as not significant when the pair of queries is associated with at least the first threshold quantity of search results that are common between the pair of the queries, whether a context exists in which the extra term is significant.

3. The method of claim 2, where determining whether the context exists in which the extra term is significant comprises:
    checking a data structure for an entry that associates the context with the extra term, the context including one or more terms with which the extra term appears in a query.

4. The method of claim 1, where, when identifying the extra term as a term that is not significant, the method further comprises:
    identifying the extra term as an optional term;
    associating, based on identifying the extra term as the optional term, a first weight with the extra term;
    associating a second weight with one or more other terms in the query, the second weight being different than the first weight; and
    processing the query, including the extra term and the one or more other terms, based on the associated first weight and the associated second weight.

5. The method of claim 4, further comprising:
    identifying, based on processing the query, one or more documents based on the query; and
    determining a respective score for each of the one or more documents, where a first document, of the one or more documents, that includes the optional term is associated with a first score that is greater than a second score of a second document, of the one or more documents, that does not include the optional term.

6. The method of claim 1, further comprising:
    analyzing the query logs to identify whether a user provided the first query followed by the second query; and
    identifying the extra term as a term that is not significant when the user provided the first query, followed by the second query, a quantity of times that exceeds a threshold.

7. The method of claim 1, further comprising:
    identifying, based on processing the query, one or more documents based on the query;
    scoring the one or more identified documents, where the extra term, when identified as not significant, contributes an amount that is greater than zero and that is less than an amount contributed by another term of the query to a score of one of the one or more identified documents; and
    providing a list of search results based on the one or more identified documents and the scoring.

8. One or more devices comprising:
    one or more processors; and
    one or more memories including a plurality of instructions that, when executed by the one or more processors, cause the one or more processors to:
        analyze query logs to identify a pair of queries that are the same except that a first query, in the pair of queries, includes an extra term that is not included in a second query in the pair of queries;
        identify whether the pair of queries is associated with a quantity of search results that are common or different between the pair of queries;
        identify the extra term as a term that is not significant when the pair of queries is associated with at least a first threshold quantity of search results that are common between the pair of queries;
identify the extra term as a term that is significant when the pair of queries is associated with at least a second threshold quantity of search results that are different between the pair of queries; and
process a query that includes the extra term based on identifying the extra term as a term that is not significant or as a term that is significant,
the query being processed differently based on whether the extra term is identified as a term that is not significant or a term that is significant.

9. The one or more devices of claim 8, where the one or more processors are further to:
determine, after identifying the extra term as not significant when the pair of queries is associated with at least the first threshold quantity of search results that are common between the pair of the queries, whether a context exists in which the extra term is significant.

10. The one or more devices of claim 9, where, when determining whether the context exists in which the extra term is significant, the one or more processors are further to:
check a data structure for an entry that associates the context with the extra term, the context including one or more terms that cause the extra term to be significant when the one or more terms appear with the extra term in a query.

11. The one or more devices of claim 8, where, when identifying the extra term as a term that is not significant, the one or more processors are further to:
identify the extra term as an optional term;
associate, based on identifying the extra term as the optional term, a first weight with the extra term;
associate a second weight with one or more other terms in the query, the second weight being different than the first weight; and
process the query, including the extra term and the one or more other terms, based on the associated first weight and the associated second weight.

12. The one or more devices of claim 11, where the one or more processors are further to:
identify, based on processing the query, one or more documents based on the query; and
determine a respective score for each of the one or more documents, where a first document, of the one or more documents, that includes the optional term is associated with a first score that is greater than a second score of a second document, of the one or more documents, that does not include the optional term.

13. The one or more devices of claim 8, where the one or more processors are further to:
analyze the query logs to identify whether a user provided the first query followed by the second query; and
identify the extra term as a term that is not significant when the user provided the first query, followed by the second query, a quantity of times that exceeds a threshold.

14. The one or more devices of claim 8, where the one or more processors are further to:
identify, based on processing the query, one or more documents based on the query;

score the one or more identified documents, where the extra term, when identified as not significant, contributes an amount that is greater than zero and that is less than an amount contributed by another term of the query to a score of one of the one or more identified documents; and
provide a list of search results based on the one or more identified documents and the scoring.

15. A method comprising:
analyzing, by a processor in a computer system, query logs to identify a pair of queries that are the same except that a first query, in the pair of queries, includes an extra term that is not included in a second query in the pair of queries;
identifying, by a processor in the computer system, whether the pair of queries is associated with a quantity of search results that are different between the pair of queries;
identifying, by a processor in the computer system, the extra term as a term that is significant when the pair of queries is associated with at least a threshold quantity of search results that are different between the pair of queries; and
processing, by a processor in the computer system, a query that includes the extra term based on identifying the extra term as a term that is significant.

16. The method of claim 15, further comprising:
determining, after identifying the extra term as significant when the pair of queries is associated with at least the threshold quantity of search results that are different between the pair of the queries, whether a context exists in which the extra term is not significant.

17. The method of claim 16, where determining whether the context exists in which the extra term is not significant comprises:
checking a data structure for an entry that associates the context with the extra term, the context including one or more terms with which the extra term appears in a query.

18. The method of claim 16, further comprising:
storing the extra term, information indicating that the extra term is identified as a term that is significant, and information indicating that the context exists in which the extra term is not significant.

19. The method of claim 15, further comprising:
analyzing the query logs to identify whether a user provided the first query followed by the second query; and
identifying the extra term as a term that is significant when the user does not provide the first query, followed by the second query, a quantity of times that exceeds a threshold.

20. The method of claim 15, further comprising:
identifying, based on processing the query, one or more documents based on the query;
scoring the one or more identified documents, where the extra term, when identified as significant, contributes an amount that is equal to an amount contributed by another term of the query to a score of one of the one or more identified documents; and
providing a list of search results based on the one or more identified documents and the scoring.

* * * * *